United States Patent
Kim et al.

(10) Patent No.: US 9,742,783 B2
(45) Date of Patent: Aug. 22, 2017

(54) METHOD FOR SENDING CONTENTS INCLUDING TRACKING INFORMATION AND APPARATUS THEREOF, AND METHOD FOR RECEIVING CONTENT INCLUDING TRACKING INFORMATION AND APPARATUS THEREOF

(71) Applicant: MarkAny Inc., Seoul (KR)

(72) Inventors: Chang Won Kim, Seoul (KR); Jeong Soo Kim, Gyeonggi-do (KR); Jong Uk Choi, Seoul (KR)

(73) Assignee: MARKANY INC., Seoul (KR)

( * ) Notice: Subject to any disclaimer, the term of this patent is extended or adjusted under 35 U.S.C. 154(b) by 0 days.

(21) Appl. No.: 14/726,385

(22) Filed: May 29, 2015

(65) Prior Publication Data

US 2016/0352754 A1 Dec. 1, 2016

(51) Int. Cl.
*G06F 21/16* (2013.01)
*H04L 29/06* (2006.01)
*H04K 1/02* (2006.01)

(52) U.S. Cl.
CPC ............ *H04L 63/123* (2013.01); *H04L 63/20* (2013.01)

(58) Field of Classification Search
None
See application file for complete search history.

(56) References Cited

U.S. PATENT DOCUMENTS

| 7,036,024 B2 * | 4/2006 | Watson | H04N 5/913 726/22 |
| 8,165,343 B1 | 4/2012 | McGowan | |
| 2004/0153648 A1 * | 8/2004 | Rotholtz | H04N 7/18 713/176 |
| 2015/0043728 A1 | 2/2015 | Markany | |
| 2015/0373300 A1 * | 12/2015 | Thorpe | G11B 27/102 386/331 |

FOREIGN PATENT DOCUMENTS

| KR | 10-2013-0043563 A | 4/2013 |
| KR | 10-2013-0116307 A | 10/2013 |

(Continued)

OTHER PUBLICATIONS

Digital Image Scource Coder Forensics Via Intrinstic Fingerprints. Lin et al. IEEE(2009).*

(Continued)

*Primary Examiner* — Venkat Perungavoor
(74) *Attorney, Agent, or Firm* — Arent Fox LLP

(57) ABSTRACT

A method for transmitting contents including tracking information is described. The method comprising the steps of generating a content transmission stream relevant to an original content, determining at least part of the original content as a forensic mark (FM) target segment, generating a FM stream including the FM segment in which a particular pattern is inserted into the FM target segment and a FM stream different from the content transmission stream and transmitting the content transmission stream and the FM stream to a receiving device, wherein the FM stream is combined with the content transmission stream based on session information related to the transmitting in the receiving device.

23 Claims, 5 Drawing Sheets

(56) References Cited

FOREIGN PATENT DOCUMENTS

KR       10-1351520 B1     1/2014
KR          1485852        1/2015

OTHER PUBLICATIONS

IP Multicast Video Broaadcsting System with User Authentication. Onishi et al. IEEE(2005).*
Session-based Watermarking in Live IPTV Environment. Jarnikov et al. IEEE(2012).*
CN101022550. English Translation. Aug. 22, 2007.*
International Search Report and Written Opinion dated Aug. 8, 2016 regarding PCT/KR2016/005619, and English translations.

* cited by examiner

METHOD FOR SENDING CONTENTS INCLUDING TRACKING INFORMATION AND APPARATUS THEREOF, AND METHOD FOR RECEIVING CONTENT INCLUDING TRACKING INFORMATION AND APPARATUS THEREOF

BACKGROUND

Field

The present invention relates to a method for transmitting and receiving contents, and more specifically to a method for transmitting and receiving contents including tracking information to prevent illegal duplication.

Background

Recently, the number of users streaming contents on the web is increasing. Streaming contents refers to a transmission method for enabling data of the content provided by a supplier to be received by a client in real-time. In this regard, streaming service can be divided largely into a stage of preparing target content to be streamed and a service stage of streaming the content upon request of a user or a terminal. Service providers apply a Digital Right Management (DRM) technology to prevent leakage and duplication of content by third parties. A DRM encryption technology is applied while content is still in a compression state through one of a plurality of video compression encoders. In other words, various contents are compressed first in a content preparation stage and undergo an encryption process. Afterwards, the encrypted content is transmitted in the form of a file at the service stage.

However, the DRM technology is inadequate to block the leakage and duplication of decrypted content. In this regard, a forensic watermarking technology is needed, which is capable of reversely tracking a leakage path of the corresponding content. Forensic watermarking inserts forensic marks into target content by modifying RGB values of the content and saving the modified RGB values while the target content is in a decompressed state. Therefore, DRM encryption is possible only when forensic watermarks are inserted into target content before it is compressed.

Forensic watermarks can be inserted according to the following two forms: inserting session information (information of a user and a terminal) on a server or at a terminal in real-time.

However, the method for inserting at the terminal in real-time posed a problem that forensic mark functions should be added to all of the receiving terminals, and the method for inserting on the server in real-time was incapable of securing the efficiency of real-time and simultaneous connection. Thus, the conventional technology poses difficulty in transmitting high-quality contents in real-time, and can play only a limited number of streams even with high performance hardware.

This leads to an improved technique for inserting forensic marks on the server in real-time, for example a technique for preparing in advance first contents into which forensic watermarks of a first pattern (Pattern 1) are inserted and second contents into which forensic watermarks of a second pattern (Pattern 2) are inserted other than the original contents, and combining them in real-time based on the session information at the time of transmitting the contents.

However, the technique such as the above should generate and save all of the contents including the first and second patterns in advance, and thus needs more than double storage space. And since the contents differ depending on each of the sessions, a content delivery network (CDN) cannot be used, it is unable to transmit contents efficiently.

SUMMARY

To solve the problem above, the first object of the present invention is to provide a method and apparatus for transmitting contents including tracking information which are capable of enhancing transmission efficiency using cache and the CDN by configuring the contents to be transmitted to each of the sessions not to be different from each other, and simultaneously achieving the efficiency of storage space by configuring a forensic mark stream with the minimum data on the server.

Further, the second object of the present invention for solving the problem above is to provide a method and apparatus for receiving contents by inserting traceability information which are capable of reversely tracking a leakage path of the original content by configuring streaming to be in an applicable form to a sender and a receiver to enable many users to insert traceability information simultaneously in real-time so that the information of the terminal and the user can be inserted into all of the contents serviced.

Meanwhile, the subject matters sought to be solved by the present invention are not limited thereto, but can be extended in various ways without departing from the technical principles and scope of the present invention.

The method for transmitting contents including tracking information according to one embodiment of the present invention for solving the above-described problem may comprise the steps of: generating a content transmission stream relevant to an original content; determining at least part of the original content as a forensic mark (FM) target segment; generating a FM stream including the FM segment in which a particular pattern is inserted into the FM target segment and a FM stream different from the content transmission stream; and transmitting the content transmission stream and the FM stream to a receiving device. At the receiving device, the FM stream may be combined with the content transmission stream based on session information relevant to the transmission.

The session information may include at least one of the information of the receiving device and the information of the user of the receiving device, and the pattern may be inserted in any one of Macro Block (MB), slice, I-Frame and Group of Picture (GOP) units.

Meanwhile, the content transmission stream includes the entire content, and the FM stream may consist of the FM segment. At the receiving device, at least part of the I-frame including the FM segment may be substituted with the corresponding I-frame of the content transmission stream selectively according to the session information.

Also, the content transmission stream is configured by removing the FM target segment from the original content, and the FM stream comprises the FM segment and the FM target segment. At the receiving device, at least part of the I-frames each including the FM segment and the FM target segment may be combined with the content transmission stream selectively according to the session information.

Meanwhile, the content transmission stream is configured by removing the FM target segment from the original content, and the FM stream may consist of mixed segments of the FM segment and the FM target segment. The mixed segment is the unit of I-Frame, and may consist of slice or MB included in the FM segment and the target segment of FM mixed in a particular order. At the receiving device, the mixed segment is recombined according to the session information so that it is combined with the content transmission stream.

The method for receiving contents including tracking information according to one embodiment of the present invention for solving the above-described problem may comprise the steps of: receiving a content transmission stream relevant to an original content; receiving a FM stream including the FM segment in which a particular pattern is inserted into the FM target segment which is at least part of the original content and a FM stream different from the content transmission stream; and combining the FM stream with the content transmission stream based on the session information relevant to the transmission.

The apparatus for transmitting contents including tracking information according to one embodiment of the present invention for solving the above-described problem may comprise: a content transmission stream generation unit for generating a content transmission stream relevant to an original content; a determination unit for determining at least part of the original content as a target segment for forensic mark; a FM stream generation unit for generating a FM stream including the FM segment in which a particular pattern is inserted into the FM target segment which is at least part of the original content and a FM stream different from the content transmission stream; and a transmission unit for transmitting the content transmission stream and the FM stream to a receiving device. At the receiving device, the FM stream is combined with the content transmission stream based on session information related to the transmitting.

The session information includes at least one of the information of the receiving device and unique identifier information of the receiving device, and the pattern may be inserted in any one of Macro Block (MB), slice, I-Frame and Group of Picture (GOP) units.

In addition, the content transmission stream may consist of the entire original content, and the FM stream includes the FM segment. At the receiving device, at least part of the I-frame including the FM segment may be substituted with the corresponding I-frame of the content transmission stream selectively according to the session information.

Meanwhile, the content transmission stream may be configured by removing the FM target segment from the original content, and the FM stream may comprise the FM segment and the FM target segment. At the receiving device, at least part of the I-frames each including the FM segment and the target segment of FM may be combined with the content transmission stream selectively according to the session information.

The content transmission stream may be configured by removing the FM target segment from the original content, and the FM stream may consist of mixed segments of the FM segment and the FM target segment. The mixed segment is the unit of I-Frame, and may consist of slice or MB included in the FM segment and the target segment of FM mixed in a particular order. In addition, at the receiving device, the mixed segment may be recombined according to the session information so that it can be combined with the content transmission stream.

The apparatus for receiving contents including tracking information according to one embodiment of the present invention for solving the above-described problem may comprise: a reception unit for receiving a content transmission stream relevant to an original content, and receiving a FM stream including the FM segment in which a particular pattern is inserted into the FM target segment which is at least part of the original content and a FM stream different from the content transmission stream; and a combination unit for combining the FM stream with the content transmission stream based on the session information relevant to the transmission.

According to the apparatus and method for transmitting and receiving contents including tracking information according to one embodiment of the present invention, the contents transmitted to each of the sessions according to the content transmission apparatus and a plurality of content receiving devices are the same, and thus it is possible to secure the efficiency of real-time and simultaneous connection by using the cache and CDN even in the case of inserting forensic marks in real-time on the server.

In addition, a forensic mark is configured with the minimum data on the server without saving a plurality of contents on which different patterns are formed with respect to the same original content, thereby simultaneously achieving the efficiency of storage space.

Further, it is possible to reversely track a leakage path of the original content by configuring streaming to be in an applicable form to a sender and a receiver to enable many users to insert traceability information simultaneously in real-time so that the information of the terminal and the user is inserted into all of the contents serviced.

Meanwhile, the subject matters sought to be solved by the present invention are not limited thereto, but can be variously extended within the scope which does not deviate from the idea and area of the present invention.

DETAILED DESCRIPTION

Figure 1:
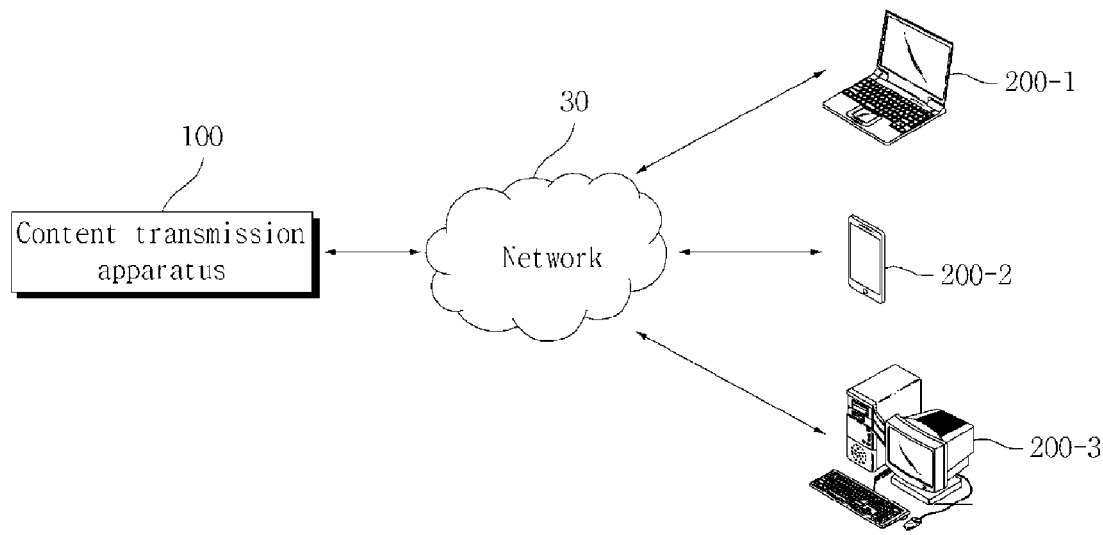
FIG. 1 is a schematic diagram of a system for transmitting and receiving contents including tracking information according to one embodiment of the present invention.

With respect to the examples of the present invention disclosed herein, particular structural or functional explanations are exemplified for the purpose of explaining the examples of the present invention, and the examples of the present invention may be carried out in various forms, but should not be interpreted as being limited to the examples explained herein.

The present invention can be modified in various ways, and various embodiments can be implemented; therefore, particular embodiments are described in detail with reference to accompanying drawings. This document is not limited to the particular embodiments, but it should be understood that descriptions of this document are applied to all the possible modifications, equivalents, or substitutes which belong to the technical principles and scope of the present invention.

Terms used in the present application have been introduced only for the purpose of describing particular embodiments but are not intended to limit the present invention. Singular expressions, unless otherwise indicated explicitly, can be used for plural expressions. It should be understood that such terms as "comprise" or "have" in the present application are meant to indicate existence of characteristics, numerals, steps, operations, constituting elements, components or a combination thereof, but do not preclude existence or additional possibility of one or more characteristics, numerals, steps, operations, constituting elements, components, or a combination thereof.

Unless otherwise defined, all of the terms used in this document, including technical or scientific ones, carry the same meaning as understood by those skilled in the art to which the present invention belongs. Those terms as defined in an ordinary dictionary should be interpreted to hold the same meaning as contextually indicated by the corresponding technology; therefore, unless otherwise defined explicitly, they should not be interpreted in an ideal manner or in an excessive formality.

In what follows, with reference to appended drawings, preferred embodiments of the present invention will be described in more detail. The same reference numerals are used for the same constituting elements used throughout the drawings, and descriptions about the same constituting elements will be omitted.

System for Transmitting and Receiving Contents Including Tracking Information

FIG. 1 is a schematic diagram of a system for transmitting and receiving contents including tracking information according to one embodiment of the present invention. A content transmission apparatus (100) is capable of streaming contents to a content receiving device (200-1, 200-2, 200-3) over a network (30), as shown in FIG. 1.

The "network" in the specification of the present invention is not limited to a particular communication method, but may be used for various wireless communication systems such as CDMA, TDMA, FDMA, OFDMA, SC-FDMA and other systems. The CDMA system may implement wireless techniques such as Universal Terrestrial Radio Access (UTRA), cdma2000, etc. The UTRA includes broadband CDMA (WCDMA) and other modifications to CDMA. Cdma2000 covers IS-2000, IS-95 and IS-856 Standards. The TDMA system may implement wireless techniques such as Global System for Mobile Communications (GSM). The OFDMA system may implement wireless techniques such as evolved UTRA (E-UTRA), Ultra Mobile Broadband (UMB), IEEE 802.11 (Wi-Fi), IEEE 802.16 (WiMAX), IEEE 802.20, Flash-OFDM®, etc. The techniques explained herein may be used for other systems and wireless techniques as well as the above-described systems and wireless techniques.

Further, the "receiving apparatus" in the specification of the present invention may be various apparatuses utilized by a user, and may include, for example, a digital broadcast receiver such as DVB (Digital Video Broadcasting), a set-top box, or a smart TV, and may also include a notebook computer, a cellular phone, a tablet PC, a navigation, a smart phone, PDA (Personal Digital Assistants) and PMP (Portable Multimedia Player). Of course, these are merely examples, and in addition to the above-described examples, all of the devices capable of communications which have been currently developed and commercialized, or will be developed in the future will be included.

Meanwhile, content streaming as above may include multimedia contents such as audio or video in which data is transmitted sequentially. When the content such as the above leaks, a forensic watermark technique which is capable of reversely tracking a leakage path of the content may be applicable. In order to insert such forensic watermark, it may be considered to insert the session information (information of a user and a terminal) at the content transmission apparatus (100) in real-time or insert the content receiving device (200) in real-time.

The system which transmits and receives content including tracking information according to one embodiment of the present invention uses a manner where when the content transmission apparatus (100) creates a content transmission stream and a FM stream to stream to the content receiving device (200), the receiving device (200) combines the content transmission stream and the FM stream based on the session information. This manner will be divided into the transmission and reception of the content and will be explained in more detail.

Method for Transmitting Contents Including Tracking Information

Figure 2:
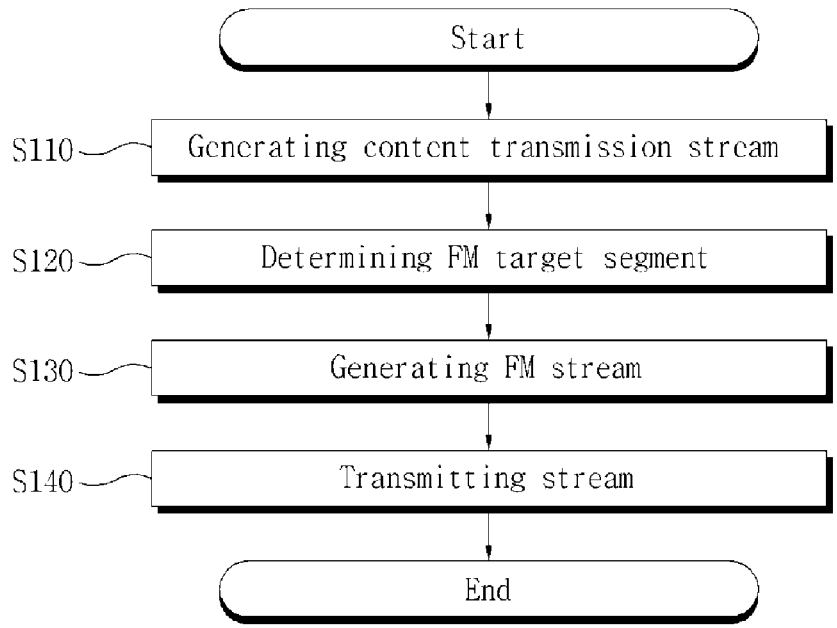
FIG. 2 is a flow diagram of a method for transmitting contents including tracking information according to one embodiment of the present invention.
Figure 6:
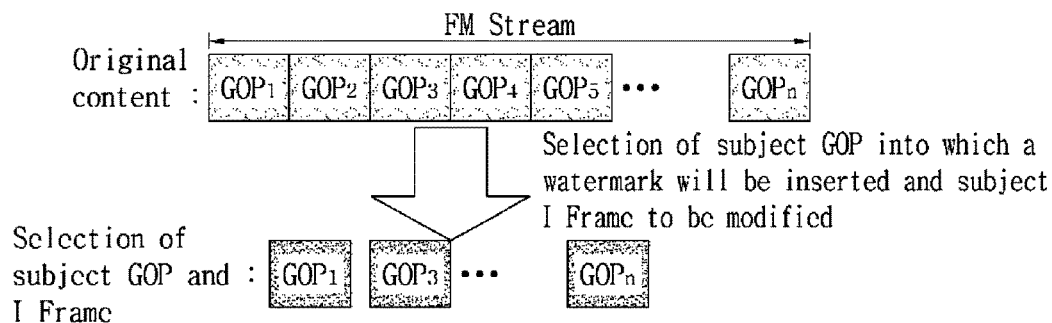
FIG. 6 is a conceptual diagram of a method for inserting forensic marks in the transmission of content according to one embodiment of the present invention.

FIG. 2 is a flow diagram of a method for transmitting contents including tracking information according to one embodiment of the present invention. FIG. 6 is a conceptual diagram of the insertion units of a forensic mark in transmitting content according to one embodiment of the present invention. Hereinafter, the method for transmitting contents including tracking information content according to one embodiment of the present invention will be explained in detail with reference to FIGS. 2 and 6.

Referring to FIG. 2, in the method for transmitting contents including tracking information according to one example of the present invention, the content transmission apparatus (100) may create a content transmission stream associate with an original content (Step S110). The content transmission stream relates to the original content sought to be streamed to the content receiving device (200) by the content transmission apparatus (100), and may include the entire original content or data other than the portion into which a forensic mark (FM) is sought to be inserted, among the data of the original content.

In this regard, the content transmission apparatus (100) may determine, as a FM target segment, at least part of the portion into which a pattern is sought to be inserted as FM, among the data of the original content (Step S120). The pattern may be inserted in any one of Macro Block (MB), slice, I-Frame and Group of Picture (GOP) units, as shown in FIG. 6. In other words, the video stream of the original content is first divided into a plurality of GOPs, and each of the GOPs includes a plurality of frames (including I-frame, B-frame, P-frame). Each of the frames is finely divided into slice and MacroBlock (MB) sequentially. The method for transmitting contents including tracking information according to one example of the present invention may configure the data of the FM stream by any one of GOP, I-frame, slice, MB units which are gradational segments of the video content, so as to determine whether to insert a particular pattern. FIG. 6 exemplifies the case of selecting a particular GOP as a FM target segment or selecting a particular I-frame included in the particular GOP.

Returning to FIG. 2, the content transmission apparatus (100) may include a FM segment to create a FM stream (Step S130). More specifically, a particular pattern may be inserted into the determined FM target segment to create a FM segment, thereby generating a FM stream including the FM segment. The FM stream is formed as a different stream from the above-described content transmission stream, and thus the content transmission stream and the FM stream may be capable of transmitting the same data in the case of streaming through any session.

If the content transmission stream and the FM stream is transmitted to the receiving device (200) (Step S140), the FM stream and the content transmission stream may be combined based on the session information relevant to the transmission of the content transmission stream and the FM stream, at the receiving device (200). The session information may include at least one of the information of the receiving device (200) and the unique identifier information of the receiving device (200). Thus, a stream of the receiver which is a resultant from being received and combined at the receiving device (200) has a format where a pattern formed based on the information of the receiving device (200) or its user is included in the original content. Thus, it is possible to reversely track a leakage path based on such pattern even in the case of illegal leakage of the content included in the stream of the receiver.

Meanwhile, in the method for transmitting contents including tracking information according to one example of the present invention, the configurations of the content transmission stream and the FM stream and the combination aspects at the receiving device are not limited to particular configurations and methods. Hereinafter, the configurations of the content transmission stream and the FM stream and the combination embodiments the receiving device are exemplarily disclosed.

Figure 7:
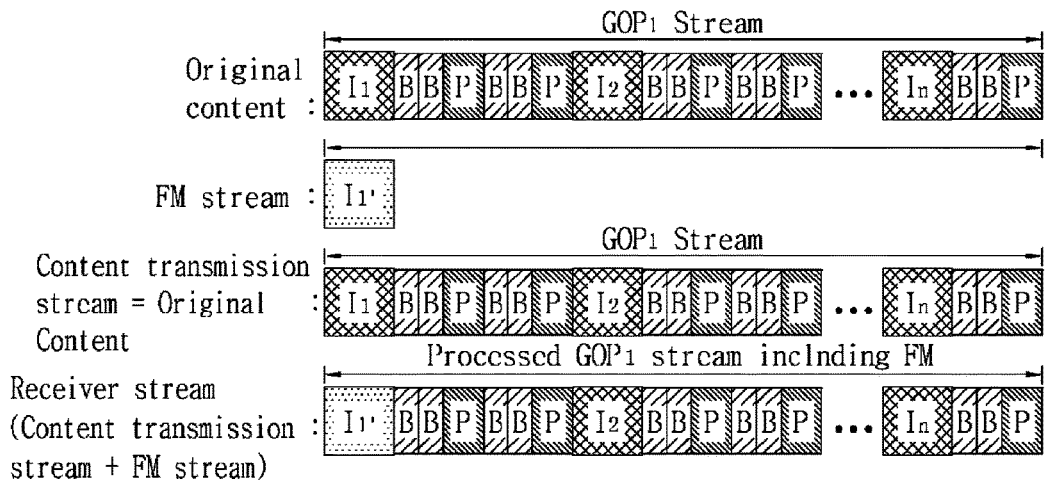
FIG. 7 is a configuration diagram representing the constitution of the streams according to an embodiment of the present invention.

FIG. 7 is a configuration diagram representing the constitution of the streams according to an embodiment of the present invention. According to the first embodiment of the present invention, the content transmission stream may include the entire original content so that it can consist of the same as the original content, and the FM stream may consist only of the FM segment, as shown in FIG. 7. In other words, the FM stream may consist only of data in which the above pattern is inserted into the data of the FM target segment which is a portion into which a pattern relevant to the FM is sought to be inserted, among the data of the original content.

In the case of configuring a stream as above, at the receiving device (200), at least part of the I-frame (e.g., I1') including the FM segment may be selected according to the session information used in the transmission of the streams, and the I-frame of the FM stream selected may be substituted with the corresponding I-frame among the I-frames included in the content transmission stream. Thus, the stream of the receiver may consist of data comprising a pattern relevant to the FM representing a receiving device and its user in the original data.

Figure 8:
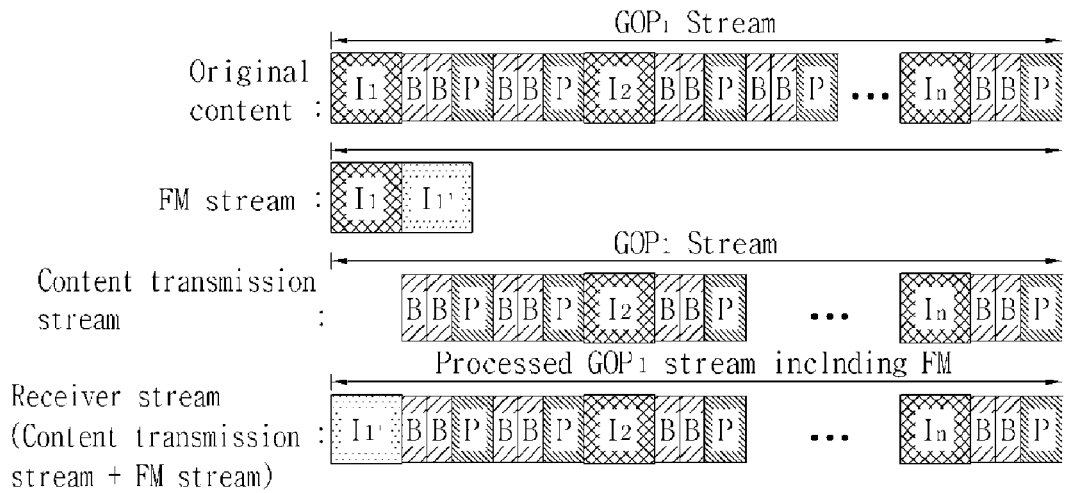
FIG. 8 is a configuration diagram representing the constitution of the streams according to an embodiment of the present invention.

FIG. 8 is a configuration diagram representing the constitution of the streams according to an embodiment of the present invention. According to the second embodiment of the present invention, the content transmission stream may be configured by removing a FM target segment from the original content, and the FM stream may comprise the FM segment and the FM target segment, as shown in FIG. 8. In other words, the content transmission stream may comprise the data other than the data of the FM target segment which is a portion into which the pattern relevant to the FM is sought to be inserted, among the data of the original content, and the FM stream may comprise both of data of the FM target segment excluded from the content transmission stream and the FM segment in which a pattern is inserted into the FM target segment.

In the case of configuring a stream as above, at the receiving device (200), at least part of the I-frame (e.g., I1') including the FM segment and the I-frame (e.g., I1') including the FM target segment may be selectively combined with the content transmission stream according to the session information used in the transmission of the streams. Thus, the stream of the receiver may be composed of data where a pattern related to the FM representing the receiving device and the user thereof is included in the original data.

Figure 9:
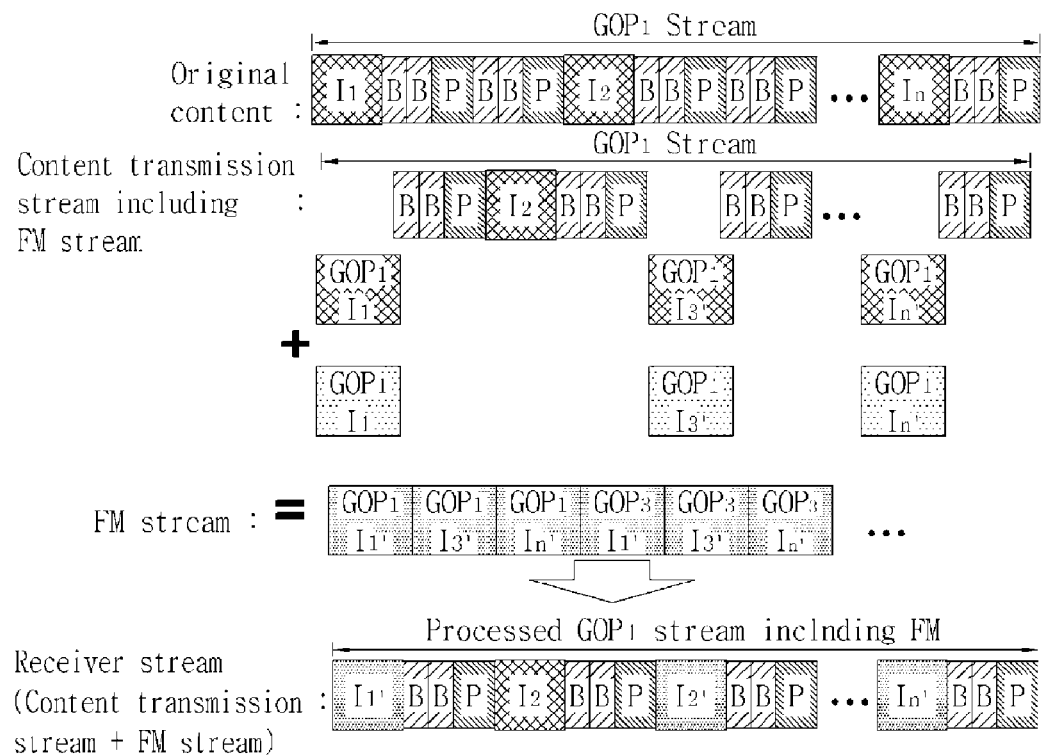
FIG. 9 is a configuration diagram representing the constitution of the streams according to an embodiment of the present invention.

FIG. 9 is a configuration diagram representing the constitution of the streams according to an embodiment of the present invention. According to the third embodiment of the present invention, the content transmission stream may be configured by removing a FM target segment from the original content, and the FM stream may consist of the FM segment and the FM target segment, as shown in FIG. 9. In other words, the FM stream may consist of mixed segments formed by mixing data of the FM target segment which is a portion into which the pattern relevant to the FM is sought to be inserted, and the FM segment where a pattern is inserted into the FM target segment in a particular order, among the data of the original content. For example, the mixed segment may be formed in units of I-frame, and may be configured by mixing slice or MB which is a smaller unit than the I-frames each included in the FM segment and the FM target segment in a particular order.

In the case of configuring a stream as above, the mixed segment may be recombined according to the session information so that it can be combined with the content transmission stream at the receiving device (200). In other words, at the receiving device (200), it is possible to combine the I-frames corresponding to the receiver by selecting each slice and MB within the I-frames in a particular combination order suitable for the session information from the target I-frame data of the FM stream. Thus, the stream of the receiver may be composed of data where a pattern relevant to the FM representing a receiving device and its user is included in the original data.

Figure 10:
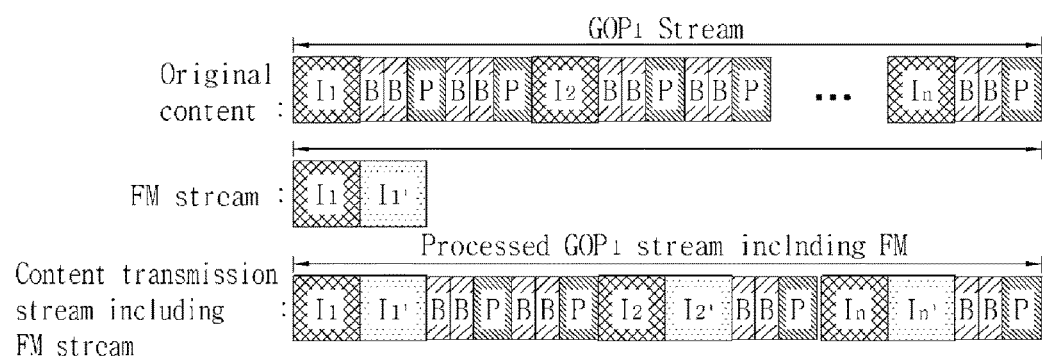
FIG. 10 is a configuration diagram representing the constitution of the streams according to an embodiment of the present invention.

FIG. 10 is a configuration diagram representing the constitution of the streams according to an embodiment of the present invention. According to the third embodiment of the present invention, the content transmission stream may comprise a FM stream created in a content transmission apparatus (100), and the content transmission apparatus (100) may be capable of transmitting the content transmission stream including the FM stream to a receiving device (200), as shown in FIG. 10.

In the case of transmitting the content transmission stream including the FM stream to the receiving device (200), at least one of the FM segment and the FM target segment included in the content transmission stream may be omitted based on the session information relevant to the transmission of the content transmission stream, at the receiving device (200). Thus, the stream of the receiver reproduced at the receiving device (200) may consist of data where a pattern relevant to the FM representing a receiving device and its user is included in the original data.

In conclusion, even in the case of following any one of the first to fourth embodiments, the content receiving device (200) can receive the FM stream and the content transmission stream altogether in a process of receiving streaming so as to configure a stream into which FM is inserted only with a simple insertion or combination. Thus, the FM stream and the content transmission stream are the same when transmitted using any session, thereby achieving efficient transmission using cache and CDN.

In addition, the FM stream may be configured with the minimum data on the content transmission apparatus (100), thereby achieving the efficiency of storage space as well.

Method for Receiving Contents Including Tracking Information

Figure 3:
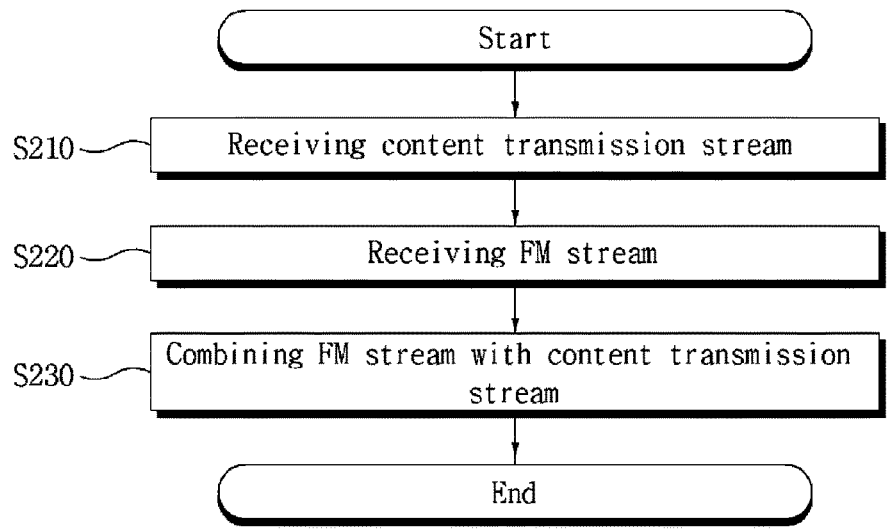
FIG. 3 is a flow diagram of a method for receiving including tracking information according to one embodiment of the present invention.

FIG. 3 is a flow diagram of a method for receiving including tracking information according to one embodiment of the present invention. Referring to FIG. 3, in the method for receiving contents including tracking information, the content receiving device (200) may first receive a content transmission stream relevant to an original content (Step S210). The content transmission stream relates to an original content which the content transmission apparatus (100) seeks to stream to the content receiving device (200), and thus may include the entire original content, or data other than the portion into which a Forensic Mark (FM) is sought to be inserted, among the data of the original content.

Further, the content receiving device (200) may include a FM segment where a particular pattern is inserted into the Forensic Mark (FM) target segment which is at least part of the original content, and receive the FM stream which is different from the content transmission stream (Step S220). If the reception of the streams is completed, the receiving device (200) may combine the FM stream with the content transmission stream based on the session information relevant to the transmission of the streams to create a stream of the receiver (Step S230). The detailed configurations and the combination aspects of the streams are explained in the section of "Method for transmitting contents including tracking information" above.

Apparatus for Transmitting Contents Including Tracking Information

Figure 4:
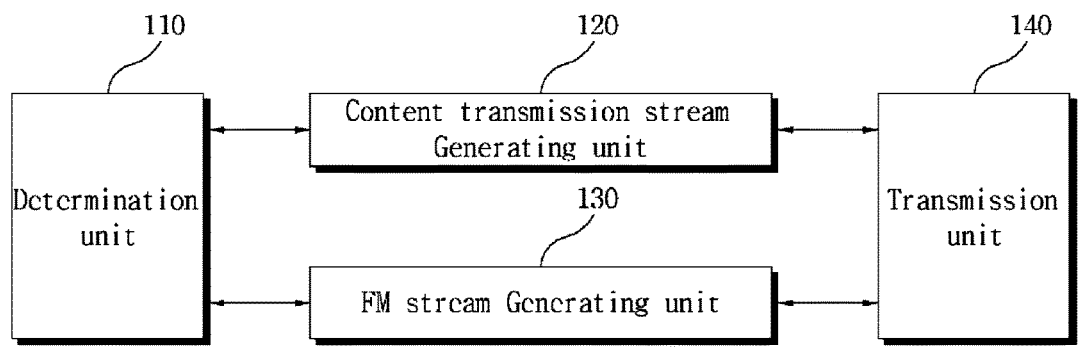
FIG. 4 is a block diagram of an apparatus for transmitting contents including tracking information according to one embodiment of the present invention.

FIG. 4 is a block diagram of an apparatus for transmitting contents including tracking information according to one embodiment of the present invention. The apparatus for transmitting contents including tracking information may comprise a determination unit (110), a content transmission stream generation unit (120), a FM stream generation unit (130) and a transmission unit (140), as shown in FIG. 4.

The content transmission stream generation unit (120) may create a content transmission stream relevant to an original content. The content transmission stream relates to an original content which the content transmission apparatus (100) seeks to stream to the receiving device (200), and thus may include the entire original content, or data other than the portion into which a Forensic Mark (FM) is sought to be inserted, among the data of the original content.

In this regard, the determination unit (100) may determine, as a Forensic Mark (FM) target segment, at least part of the original content. In other words, the determination unit (100) may determine, as a Forensic Mark (FM) target segment, at least part of the portion into which a pattern is sought to be inserted as FM, among the data of the original content. The pattern may be inserted in any one of Macro Block (MB), slice, I-Frame and Group of Picture (GOP) units, as shown in FIG. 6.

Returning to FIG. 4, the FM stream generation unit (130) may create a FM stream by inclusion of a FM segment. More specifically, a particular pattern may be inserted into the determined FM target segment to create a FM segment and a FM stream including the FM segment. The FM stream is formed as a different stream from the above-described content transmission stream, and thus the content transmission stream and the FM stream may be capable of transmitting the same date in the case of streaming through any session.

The transmission unit (140) may be capable of transmitting the content transmission stream and the FM stream to the receiving device (200). At the receiving device (200), the FM stream may be combined with the content transmission stream based on the session information relevant to the transmission of the content transmission stream and the FM stream. The session information may include at least one of the information of the receiving device (200) and unique identifier information of the receiving device (200). Thus, a stream of the receiver which is a resultant from being received and combined at the receiving device (200) has a format where a pattern formed based on the receiving device (200) or the information of the user in included in the original content. Thus, it is possible to reversely track a leakage path based on such pattern even in the case of illegal leakage of the content included in the stream of the receiver.

Meanwhile, in the method for transmitting contents including tracking information according to one example of the present invention, the configurations of the content transmission stream and the FM stream and the combination aspects at the receiving device are not limited to particular configurations and methods. With respect to the above-described "Method for transmitting contents including tracking information," the configurations of the content transmission stream and the FM stream and the combination embodiments the receiving device are exemplarily disclosed above.

Apparatus for Receiving Contents Including Tracking Information

Figure 5:
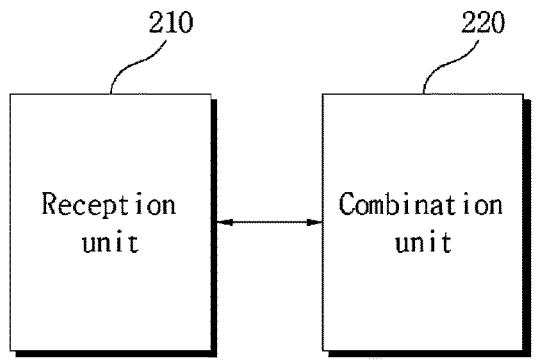
FIG. 5 is a block diagram of an apparatus for receiving contents including tracking information according to one embodiment of the present invention.

FIG. 5 is a block diagram of an apparatus for receiving contents including tracking information according to one embodiment of the present invention. The apparatus for receiving contents including tracking information according to one embodiment of the present invention may comprise a reception unit (210) and a combination unit (220), as shown in FIG. 5.

The reception unit (210) may receive a content transmission stream relevant to an original content, and a FM stream including the FM segment in which a particular pattern is inserted into the FM target segment and a FM stream different from the content transmission stream.

The combination unit (220) may be capable of combining the FM stream with the content transmission stream based on the session information relevant to the transmission.

A specific embodiment of the apparatus for receiving contents including tracking information according to one embodiment of the present invention may follow the above-described method for receiving contents including tracking information.

With respect to the exemplary embodiments disclosed herein, a person skilled in the art could recognize that various exemplary logic blocks, modules, circuits and algorithm steps explained may be implemented as electronic hardware, computer software or a combination thereof.

To clearly exemplify the interchangeability between the hardware and the software as above, various exemplary components, blocks, modules, circuits and steps are generally described, in view of the functions thereof. However, whether the functionality may be implemented as hardware or software depends on design limitations and particular applications given to the entire system. A person skilled person may implement the explained functionality in various manners for each of the particular applications, but the determination on the implementation should not be interpreted as being outside the scope of the present invention.

The method, sequence and/or algorithm described with respect to the exemplary embodiments disclosed herein may be implemented directly as hardware, a software module executed by a processor, or a combination thereof. The software module may reside in a RAM memory, a flash memory, a ROM memory, an EPROM memory, an EEPROM memory, a register, a hard disk, a detachable disk, CD-ROM, or a storage medium in an arbitrary form known in the art. The exemplary storage medium is coupled to a processor so that the processor can read information from the storage medium and write the information in the storage medium. Alternatively, the storage medium may be incorporated into the processor.

The present invention has been described with reference to accompanying preferred embodiments; however, and it should be understood by a person skilled in the art that the present invention can be modified or revised in various ways without departing from the technical principles and scope of the present invention defined by the following claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A method for transmitting contents including tracking information, the method comprising the steps of:
   generating a content transmission stream relevant to an original content;
   determining at least part of the original content as a forensic mark (FM) target segment;
   generating a FM stream including a FM segment in which a particular pattern is inserted into the FM target segment wherein the FM stream is different from the content transmission stream; and
   transmitting the content transmission stream not including the FM segment and the FM stream including the FM segment to a receiving device,
   wherein the FM stream received is combined with the content transmission stream received based on session information related to the transmitting in the receiving device to generate at least a stream.

2. The method according to claim 1, wherein the session information includes at least one of information of the receiving device and unique identifier information of the receiving device.

3. The method according to claim 1, wherein the pattern is inserted in any one of Macro Block (MB), slice, I-Frame and Group of Picture (GOP) units.

4. The method according to claim 1, wherein the content transmission stream includes the entire original content, and
   Wherein the FM stream includes the FM segment.

5. The method according to claim 4, wherein at least part of the I-frame including the FM segment is selectively substituted with the corresponding I-frame of the content transmission stream according to the session.

6. The method according to claim 1, wherein the content transmission stream is configured by removing the FM target segment from the original content, and
   wherein the FM stream includes the FM segment and the FM target segment.

7. The method according to claim 6, wherein at least part of the I-frames each including the FM segment and the target segment of FM is selectively combined with the content transmission stream according to the session information in the receiving device.

8. The method according to claim 1, wherein the content transmission stream is configured by removing the FM target segment from the original content, and
   wherein the FM stream includes mixed segments of the FM segment and the FM target segment.

9. The method according to claim 8, wherein the mixed segment is the unit of I-Frame, and is mixed with a slice or MB included in the FM segment in a particular order.

10. The method according to claim 9, wherein the mixed segment is recombined according to the session information and the mixed segment is combined with the content transmission stream at the receiving device.

11. An apparatus for transmitting contents including tracking information, the apparatus comprising:
    a content transmission stream generation unit for generating a content transmission stream relevant to the original content;
    a determination unit for determining at least part of the original content as a forensic mark (FM) target segment;
    a FM stream generation unit for generating a FM stream including a FM segment in which a particular pattern is inserted into the FM target segment and wherein the FM stream is different from the content transmission stream; and
    a transmission unit for transmitting the content transmission stream not including the FM segment and the FM stream including the FM segment to a receiving device,
    wherein the FM stream received is combined with the content transmission stream received based on session information related to the transmitting in the receiving device to generate at least a stream.

12. The apparatus according to claim 11, wherein the session information includes at least one of the information of the receiving device and unique identifier information of the receiving device.

13. The apparatus according to claim 11, wherein the pattern is inserted in any one of Macro Block (MB), slice, I-Frame and Group of Picture (GOP) units.

14. The apparatus according to claim 11, wherein the content transmission stream includes the entire original content, and the FM stream includes the FM segment.

15. The apparatus according to claim 14, wherein at least part of the I-frame including the FM segment is selectively substituted with the corresponding I-frame of the content transmission stream according to the session information in the receiving device.

16. The apparatus according to claim 11, wherein the content transmission stream is configured by removing the FM target segment from the original content, and
    wherein the FM stream includes the FM segment and the FM target segment.

17. The apparatus according to claim 16, wherein at least part of the I-frames each including the FM segment and the FM target segment is selectively combined with the content transmission stream according to the session information in the receiving device.

18. The apparatus according to claim 11, wherein the content transmission stream is configured by removing the FM target segment from the original content, and wherein the FM stream includes mixed segments of the FM segment and the FM target segment.

19. The apparatus according to claim 18, wherein the mixed segment is the unit of I-Frame, and is mixed with a slice or MB included in the FM segment in a particular order.

20. The apparatus according to claim 19, wherein the mixed segment is recombined according to the session information and the mixed segment is combined with the content transmission stream in the receiving device.

21. A method for transmitting contents including tracking information, comprising the steps of:
   generating a content transmission stream relevant to an original content;
   determining at least part of the original content as a forensic mark (FM) target segment;
   generating a FM stream including the FM target segment and a FM segment in which a particular pattern is inserted into the FM target segment; and
   including the FM stream in the content transmission stream and transmitting the content transmission stream to a receiving device,
   wherein at least one of the FM segment and the FM target segment included in the content transmission stream received is omitted based on the session information related to the transmitting in the receiving device to reproduce at least a stream.

22. The method according to claim 21, wherein the session information includes at least one of the information of the receiving device and unique identifier information of the receiving device.

23. The method according to claim 21, wherein the pattern is inserted in any one of Macro Block (MB), slice, I-Frame and Group of Picture (GOP) units.

* * * * *